(12) United States Patent
Ilfrey

(10) Patent No.: US 8,753,719 B1
(45) Date of Patent: Jun. 17, 2014

(54) SUBSTRATE COLORATION METHODS

(75) Inventor: Patrick Ilfrey, White Bear Lake, MN (US)

(73) Assignee: Citadel Restoration and Repair, Inc., North St. Paul, MN (US)

( * ) Notice: Subject to any disclaimer, the term of this patent is extended or adjusted under 35 U.S.C. 154(b) by 246 days.

(21) Appl. No.: 13/199,881

(22) Filed: Sep. 12, 2011

Related U.S. Application Data

(60) Provisional application No. 61/403,155, filed on Sep. 10, 2010.

(51) Int. Cl.
*B05D 5/06* (2006.01)
*B05D 3/04* (2006.01)
*B05D 7/08* (2006.01)
*B05D 7/16* (2006.01)

(52) U.S. Cl.
CPC ............. *B05D 5/06* (2013.01); *B05D 3/0406* (2013.01); *B05D 7/08* (2013.01); *B05D 7/16* (2013.01); *B05D 2202/00* (2013.01); *B05D 2203/20* (2013.01); *B05D 2203/30* (2013.01); *B05D 2203/35* (2013.01); *B05D 2502/00* (2013.01); *B05D 2502/005* (2013.01); *B05D 2503/00* (2013.01); *B05D 2504/00* (2013.01)
USPC ........ 427/280; 427/281; 427/385.5; 427/386; 427/388.1; 427/389.8; 427/393; 427/393.6; 427/397

(58) Field of Classification Search
None
See application file for complete search history.

(56) References Cited

U.S. PATENT DOCUMENTS

| | | | | |
|---|---|---|---|---|
| 2,351,717 A | * | 6/1944 | Le Roy | 427/240 |
| 2,511,627 A | * | 6/1950 | Einbecker | 427/280 |
| 3,047,418 A | * | 7/1962 | Compton | 427/280 |
| 3,549,391 A | * | 12/1970 | Holtzapfel et al. | 427/385.5 |
| 4,721,634 A | * | 1/1988 | McKinnon | 427/263 |
| 4,975,303 A | * | 12/1990 | McKinnon | 427/263 |
| 5,055,324 A | * | 10/1991 | Stecker | 427/281 |
| 5,069,939 A | * | 12/1991 | McKinnon | 427/262 |
| 5,571,562 A | * | 11/1996 | Wakat | 427/280 |
| 6,025,023 A | * | 2/2000 | Valente et al. | 427/256 |
| 2005/0106395 A1 | * | 5/2005 | Asher | 428/423.1 |
| 2008/0173728 A1 | * | 7/2008 | Ilfrey | 239/74 |
| 2009/0148683 A1 | * | 6/2009 | Ilfrey | 428/215 |
| 2012/0027993 A1 | * | 2/2012 | Schmid et al. | 428/141 |

* cited by examiner

*Primary Examiner* — Erma Cameron
(74) *Attorney, Agent, or Firm* — Chris Whewell

(57) ABSTRACT

Methods for treating various substrates to impart unique and artistic finishes thereto, comprising the application of a plurality of separate pigmented curable liquid compositions thereto. In some embodiments the pigmented curable liquid compositions are applied in such fashion to preclude formation of a homogeneous pigmented mixture. In some embodiments this is achieved by applying a second pigmented curable liquid composition over a first pigmented curable liquid composition prior to the full cure of the former. In other embodiments, this is achieved by simultaneous application of two pigmented curable liquid compositions which are non-homogeneous.

8 Claims, No Drawings

SUBSTRATE COLORATION METHODS

CROSS REFERENCE TO RELATED APPLICATIONS

This application claims the benefit of U.S. Provisional Application No. 61/403,155 filed Sep. 10, 2010, the entire contents of which are herein incorporated by reference.

TECHNICAL FIELD

This disclosure relates generally to coatings, and more particularly to coatings for surfaces including floor surfaces, which coatings are simultaneously protective and are color-imparting.

BACKGROUND OF THE INVENTION

Various treatments are given to concrete floors and other surfaces having the same or similar makeup, for imparting decorative coloration to the surfaces, which surfaces are subsequently sealed to protect the underlying coloration. In a method of the present disclosure the coloration and sealing are imparted simultaneously.

Generally, there are two categories of concrete stains: reactive and non-reactive. The former category includes the use of chemical stains which are typically water-based acidic solutions containing metallic salts that react with the concrete's lime content. Once the chemical reaction takes place, the stain forms a permanent bond with the concrete and won't chip off or peel away.

Acid staining is reactive and transforms an ordinary concrete slab into a unique and beautifully imperfect floor. No two floors treated with acid staining are ever alike because every slab absorbs the color differently. Color differences may be evident from one room to the next—or even from one side of the same room to the other, because the original concrete may have been poured from different batches, even if poured at the same time. An acid stain process renders varying degrees of intensity, creating multi-hued color variations that appear perfectly aged. Therefore one should expect variability, not uniformity from acid staining of concrete. Such staining achieves beauty in an "Old World" imperfect way.

The acid staining process is effected by creating a chemical reaction on and within the concrete. Acid in the solution opens up the pores of the concrete, and metallic salts, also present in the solution, react with lime, an ingredient of cement. Because it actually creates the color in the concrete as opposed to merely on the concrete, there is no layer of pigment and thus the finish cannot peel, and the color is permanent. It may fade or dull slightly, but it is there for the life of the concrete.

Scoring or cutting shallow lines in the concrete, often in a large square or diagonal "tile" pattern, is an attractive option for acid-stained floors. The score lines can be grouted (i.e. filled) if desired, but are usually left open, for mortar grout is one of the things most consumers find least attractive—and troublesome.—about tile. Additionally, there are known in the art special saw blades designed for scoring which create a square groove. This effect is much more attractive than that produced by an ordinary narrow blade, which produces a shallow "V" type of cut.

Acid stained surfaces are usually sealed to enhance the color and to prevent staining of the unwanted kind, e.g. from spills and such. There are pros and cons to the different types of sealers available. Solvent-based sealers increase the depth and intensity of the color and are fairly glossy. When an application calls for a solvent-based sealer, a 100% acrylic 'breathable' sealer specially formulated for use on stained concrete is sometimes employed.

For many years, decorative concrete contractors have been using acid-based chemical stains to achieve rich, earth-toned color schemes resembling natural stone, marble, wood, or even leather. But today, contractors are no longer limited to earthy shades. Newer products on the market, such as water-based and solvent-based concrete dyes, are greatly expanding the artist's palette with colors ranging from soft pastels to vivid reds, oranges, yellows, and purples.

Concrete stain does more than add color. Rather than produce a solid, opaque effect like paint or colored coatings, stains permeate the concrete to infuse it with rich, deep, translucent tones. Depending on the color and application techniques used, the results can mimic everything from polished marble to tanned leather to natural stone or even stained wood.

Unlike stains, which react chemically with the calcium species (lime, et al.) present in concrete, dyes are non-reactive and impart color by penetrating concrete or other porous cementitious surfaces. Dyes are much smaller in particle size than chemical stains or acrylic stains, thus allowing for easier penetration and color saturation while leaving less residue on the surface. The small dye particles fill the pores of the concrete and are very hard to remove, making dyes nearly as permanent as acid stains. Because there is virtually no residue, minimal cleanup is required, greatly speeding the application process. Concrete dyes also provide permanent translucent penetrating color to concrete. Unlike acid stain, dyes do not chemically react with the concrete, and thus can be more predictable. They are generally more vivid in color as well, but can be diluted to soften or lighten the tone. They can be combined with other colors to produce custom hues in mottled and variegated effects. Dyes can also be applied to produce more of a monotone effect.

Dyes are available in water-based or solvent-based formulations and produce looks ranging from monotone to translucent, depending on how they are applied. Water-based dyes typically produce more marbling and variegation (similar to the look of a chemical stain), while solvent-based dyes tend to be more monotone and uniform in color. Some manufacturers' water- and solvent-based dyes can be combined to produce special color effects. The downside to dyes is that they penetrate very fast, leaving little room for error during application. Also, dies are generally not stable to ultraviolet light, and most manufacturers recommend indoor use only.

In the non-reactive category are water-based acrylic stains that don't rely on a chemical reaction to impart color. Instead, they are formulated to penetrate the concrete surface and deposit their pigment particles in the open pores. Non-reactive stains have grown in popularity in recent years because they are available in a much broader palette of colors than acid stains, and are easier to apply. However, the non-reactive stains do not produce the same variegated, translucent color tones characteristic of acid stains. The color effects tend to be more opaque and more uniform. Water-based urethane sealers are also non-reactive towards a concrete substrate and are sometimes employed as they provide a softer sheen and often a more natural appearance with less color intensification. Urethane sealers are more durable than acrylics, but acrylics are less expensive and easier to apply and re-apply than urethanes.

Once the desired color effects have been achieved, the floor or other substrate is sealed, usually with two coats of a solvent-based sealer. Following that, application of a wax to serve as a "sacrificial layer" for foot traffic to extend and maximize the life of the sealer is sometimes laid down using conventional techniques.

DETAILED DESCRIPTION

A method according to some embodiments of the present disclosure involves combination of two separate pigmented curable liquid compositions with one another, to provide a non-homogeneous mixture of a curable liquid composition disposed on a surface, including without limitation surfaces such as a floors and walls, which include those made of concrete, and mortar, and also those including Portland cement as a component. In some embodiments the curable liquid composition is caused to be substantially evenly disposed upon the surface being treated. The non-homogeneous mixture so disposed on such surface is subsequently permitted to cure upon its being exposed to ambient air, thus providing a cured coating on the surface. In some embodiments, the cured coating serves as a protective layer in addition to its imparting coloration to the surface.

In accordance with some embodiments of the present disclosure, there are provided at least two separate liquid compositions in at least two separate containers or other effective arrangement for maintaining the at least two separate liquid compositions to be physically separate from one another, each of which compositions in some embodiments being curable upon exposure to ambient air, which air typically contains sufficient humidity or moisture to effect curing of the compositions. Thus, moisture-curable compositions including without limitation moisture-curable polyurethanes, moisture-curable polyureas, moisture-curable epoxy polymer coatings, moisture-curable polyaspartic polyurea polymer coatings, and moisture-curable urethane-modified acrylic polymer coatings are suitable for use as curable liquid compositions to which pigments are added according to this disclosure, the pigmented curable liquid compositions then being used in accordance with this disclosure.

In some embodiments, it is not desirable to provide a homogeneous mixture of pigmented curable compositions onto a substrate when proceeding according to this disclosure, for doing so negates the ability of such composition to produce the effect of the invention conferred by having two different separate and distinct pigmented curable liquid compositions.

Each of the first pigmented curable liquid composition and said second pigmented curable liquid composition useful herein comprise a curable liquid composition independently selected from the group consisting of: moisture-curable polyurethanes, moisture-curable polyureas, moisture-curable epoxy polymer coatings, moisture-curable polyaspartic polyurea polymer coatings, and moisture-curable urethane-modified acrylic polymer coatings.

Some pigmented curable liquid compositions useful herein comprise a reactive —NCO (isocyanate) group on a molecule in the material, or as an intermediate. The isocyanate component useful in providing a polyurethane (or polyurea, or urethane-modified acrylic, or aspartate-derived material) pigmented curable liquid composition useful herein, may, at the option of the user, comprise any number of suitable aromatic or aliphatic-based prepolymers or quasi-prepolymers as a component. These include standard isocyanate compositions known to those skilled in the art. Preferred examples include MDI-based quasi-prepolymers such as those available commercially as RUBINATE® 9480, RUBINATE®. 9484, and RUBINATE® 9495 from the Huntsman family of companies of 10003 Woodloch Forest Drive in The Woodlands, Tex. The isocyanates employed can include aliphatic isocyanates described in U.S. Pat. No. 4,748,192. These include aliphatic di-isocyanates and, more particularly, are the trimerized or the biuretic form of an aliphatic di-isocyanate, such as hexamethylene di-isocyanate ("HDI"), or the bi-functional monomer of the tetraalkyl xylene di-isocyanate, such as the tetramethyl xylene di-isocyanate. Cyclohexane di-isocyanate is also to be considered a useful aliphatic isocyanate. Other useful aliphatic polyisocyanates are described in U.S. Pat. No. 4,705,814. These include aliphatic di-isocyanates, for example, alkylene di-isocyanates with 4 to 12 carbon atoms in the alkylene radical, such as 1,12-dodecane di-isocyanate and 1,4-tetramethylene di-isocyanate. Also useful are cycloaliphatic di-isocyanates, such as 1,3 and 1,4-cyclohexane di-isocyanate as well as any mixture of these isomers, 1-isocyanato-3,3,5-trimethyl-5-isocyanatomethyl-cyclohexane (isophorone di-isocyanate); 4,4'-,2,2'- and 2,4'-dicyclohexylmethane di-isocyanate as well as the corresponding isomer mixtures, and the like. All US patents mentioned in this specification are herein fully incorporated by reference thereto.

A wide variety of aromatic polyisocyanates may also be used in providing a pigmented curable liquid composition useful herein. Aromatic polyisocyanates which are useful for this include p-phenylene di-isocyanate, polymethylene polyphenylisocyanate, 2,6-toluene di-isocyanate, dianisidine di-isocyanate, bitolylene di-isocyanate, naphthalene-1,4-di-isocyanate, bis(4-isocyanatophenyl)methane, bis(3-methyl-3-iso-cyanatophenyl)methane, bis(3-methyl-4-isocyanatophenyl)methane, and 4,4'-diphenylpropane di-isocyanate. Other useful aromatic polyisocyanates include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979. Usually methylene-bridged polyphenyl polyisocyanate mixtures contain about 20 to about 100 weight percent methylene di-phenyl-di-isocyanate isomers, with the balance being polymethylene polyphenyl di-isocyanates having higher functionalities and higher molecular weights. Typical of these are polyphenyl polyisocyanate mixtures containing about 20 to about 100 weight percent di-phenyl-di-isocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979. One preferred aromatic polyisocyanate is methylene bis(4-phenylisocyanate) or MDI. Pure MDI, quasi-prepolymers of MDI, modified pure MDI, etc. are useful to prepare pigmented curable liquid compositions useful according to this disclosure. Since pure MDI is a solid and, thus, often inconvenient to use, liquid products based on MDI or methylene bis(4-phenylisocyanate) are also useful herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI. The term "isocyanate" as used herein also includes quasi-prepolymers of isocyanates or polyisocyanates with active-hydrogen containing materials. Thus, any of the isocyanates mentioned above may be used as the isocyanate component in forming or providing a pigmented curable liquid composition useful according to this disclosure.

Epoxy-based compositions are also useful in providing a pigmented curable liquid composition useful in accordance with this disclosure. Many epoxy dispersions are two-component mixtures, comprising a first component and a second component, the two components each being supplied separately and mixed just prior to application, wherein the first component comprises an epoxy resin and wherein the second component comprises a curing agent and water, as is known in the art.

In the case of such epoxy coating compositions, one component of the two part mixture from which the curable blend is formed, the (A) component, may be any material or mixture of two or more materials which contains at least two epoxy groups in its (their) molecular structure, including, for illustrative purposes, and without limitation: epoxy NOVOLAC D.E.N.® 438 resin, D.E.R.® 354 resin, and NOVOLAC D.E.N.® 431 resin, (all trademarks of the Dow Chemical Company), ARALDITE® EPN 1180 resin (Ciba-Geigy) as well as other epoxy resins and precursors specified in US Patent Application US 2005/0234216, the entire contents of which are herein incorporated by reference thereto. Essentially any organic molecule having two epoxy groups are generally suitable as raw materials from which epoxy polymers may be provided by admixture with a polyamine, which epoxy materials are suitable candidates to have a pigment added to provide a pigmented curable liquid composition useful according to this disclosure.

For urethanes, ureas and epoxies, various organic amines known to those skilled in the art as being useful in providing such materials are useful in providing a pigmented curable liquid composition useful according to this disclosure. This is true even for materials having reactive components which must be mixed substantially immediately prior to use. Without limitation, the useful amines include all polyamino compounds described, specifically recited, and/or incorporated by reference herein, including primary and secondary polyamines, whether they are aliphatic, aromatic or polyether polyamines. Thus, the amine component or amine-containing component, typically comprises one, and optionally, dictated by the personal desires of the user, more than one organic polyamino compound(s) which have at least one active hydrogen on each of nitrogen atoms present on a single molecule of such compound(s), or in a mixture of two or more such polyamino compounds. A hydrogen atom is considered to be an active (or reactive) hydrogen for purposes of the instant disclosure if it is capable of participating in the Zerevitinov reaction (Th. Zerevitinov, Ber. 40, 2023 (1907)) to liberate methane from methylmagnesium bromide. Any polyamine compound having at least two nitrogen atoms in its molecular structure, wherein each of at least two of the nitrogen atoms present in the molecule have at least one active hydrogen atom attached to them, are suitable for providing a composition from which a curable pigmented liquid composition according to the present disclosure may be derived. Specific suitable amines include, without limitation, N-aminoethylpiperazine; diethylenetriamine; triethylenetetramine; tetraethylenepentamine; 2-methylpentamethylene; 1,3-pentanediamine; trimethylhexamethylene diamine; polyamides; polyamidoamines; Mannich-base diamines and triamines; bis(aminomethyl)cyclohexylamine; isophorone diamine; menthane diamine; bis(p-aminocyclohexyl)methane; 2,2'-dimethyl bis(p-aminocyclohexyl)methane; dimethyldicyclohexylmethane); 1,2-diaminocyclohexane; 1,4-diaminocyclohexane; meta-xylene diamine; norbornanediamine; meta-phenylene diamine; diaminodiphenylsulfone; methylene dianiline; JEFFAMINE® D-230 amine (registered trademark of the Huntsman Corporation); JEFFAMINE® D-400 amine; JEFFAMINE® T-403 amine; and diethyltoluenediamine. Also suitable are blends comprised of mid- to high-molecular weight polyether polyamines, low-molecular weight amine chain extenders, and other optional additives such as adhesion promoters, and light stabilizers. The polyether polyamines may serve as the mid- to high-molecular weight amine components and are a key building block in the layer's soft block segments. In one embodiment, suitable polyether amines include those commercially available from Huntsman LLC of The Woodlands, Tex., including without limitation amines, JEFFAMINE® D-2000 amines, and JEFFAMINE® T-5000 amines, and substantial functional equivalents thereof from other suppliers including BASF. According to one embodiment, a two-component aqueous based epoxy dispersion coating material that is suitable for providing a pigmented curable liquid composition according to this disclosure is the material known as CFFS-711™ coating, available from Citadel Floor Finishing Systems of 3001 $103^{rd}$ Lane Northeast, Blaine, Minn. 55449 ("CFFS").

The examples provided below are illustrative of the present invention and shall not be construed as being delimitive thereof, as readily appreciated by those of ordinary skill in the art.

Example I

One Day Floor—Marble Finish—Concrete

A concrete slab floor is etched with RockSolid™ Safe Etch product from Citadel Floor Finishing Systems of Blaine, Minn. ("CFFS") per the manufacture's instructions. Subsequent to such treatment, and after the floor has dried for 2-3 hours, a first pigmented curable liquid composition is prepared by mixing (using a conventional paint-mixing blade chucked into a low-speed drill) in a ½ gallon bucket, 48 fluid oz. of Poly One Clear™ coating (CFFS), and 12% by volume (5.76 oz. av.) of Sienna Universal Industrial Tint™ product (CFFS). A second pigmented curable liquid composition is prepared by mixing, in a separate ½ gallon bucket, 48 oz. of Poly One Clear™ product (CFFS) and 12% by volume (5.76 oz) Brick Red Universal Industrial Tint (CFFS). Substantially equal volumes of each of the first and second pigmented curable liquid compositions are poured into a dual-chambered tray "Dual Tray" from CFFS. A DUALIE™ Dual Roller Cover (available from CFFS) is then used to distribute both the first pigmented curable liquid composition and the second pigmented curable liquid composition materials onto the concrete slab floor surface simultaneously, at an application rate of 350 square feet per gallon, and randomly cross-rolled until the desired finish is achieved. Floor is than ready for foot traffic in 6 hours and full service in 24 hours.

Example II

One Day Floor—Marble Finish—Concrete

A concrete slab floor is etched with RockSolid™ Safe Etch product from Citadel Floor Finishing Systems of Blaine, Minn. ("CFFS") per the manufacture's instructions. Subsequent to such treatment, and after the floor has dried for 2-3 hours, a first pigmented curable liquid composition is prepared by mixing (using a conventional paint-mixing blade chucked into a low-speed drill) in a ½ gallon bucket, 48 fluid oz. of Poly One Clear™ coating (CFFS), and 12% by volume (5.76 oz. av.) of Limestone Universal Industrial Tint™ product (CFFS). A second pigmented curable liquid composition is prepared by mixing, in a separate ½ gallon bucket, 48 oz. of Poly One Clear™ product (CFFS) and 12% by volume (5.76 oz) Earth Brown Universal Industrial Tint (CFFS). The first pigmented curable liquid composition having Limestone pigment is rolled out on the concrete slab surface utilizing a ⅜" nap mohair paint roller at a rate of about 400 square feet per gallon. After the first pigmented curable liquid composition has been applied, the second pigmented curable liquid composition pigmented with Earth Brown pigment is applied over the first pigmented curable liquid composition that was previously applied, using a 9" sponge roller from SHUR-LINE® division of Newell Rubbermaid Company and applied at a rate of about 1000 square feet per gallon. The floor is subsequently ready for foot traffic in about 6 hours, and for full service in 24 hours.

Example III

One Day Floor—Marble Finish on Concrete

A concrete floor is diamond ground with 40 grit segmented diamonds and all dust and debris is collected utilizing a vacuum cleaner. Subsequent to such treatment, a first pigmented curable liquid composition is prepared by mixing (using a conventional paint-mixing blade chucked into a low-speed drill) in a ½ gallon bucket, 48 fluid oz. of Poly One Clear™ coating (CFFS), and 12% by volume (5.76 oz. av.) of Pewter Universal Industrial Tint™ product (CFFS). A second pigmented curable liquid composition is prepared by mixing, in a separate ½ gallon bucket, 48 oz. of Poly One Clear™ product (CFFS) and 12% by volume (5.76 oz) Nickel Universal Industrial Tint (CFFS). The first pigmented curable liquid composition having Pewter pigment is rolled out on the surface utilizing a ⅜" nap mohair paint roller at a rate of about 400 square feet per gallon. After the first pigmented curable liquid composition has been applied, the second pigmented curable liquid composition pigmented with Nickel pigment is applied over the first pigmented curable liquid composition that was previously applied, using a 9" rag roller from The Woolie, Inc. 9303 Plymouth Ave North, Suite 101, Golden Valley, Minn. 55427, and applied at a rate of about 1000 square feet per gallon. The floor is subsequently ready for foot traffic in about 6 hours, and for full service in 24 hours.

Example IV

Liquid Tile

A linoleum floor is sanded with 80 grit sandpaper and cleaned with Acetone. A first pigmented curable liquid composition is prepared by mixing (using a conventional paint-mixing blade chucked into a low-speed drill) in a ½ gallon bucket, 48 fluid oz. of Poly One Clear™ coating (CFFS), and 12% by volume (5.76 oz. av.) of Sienna Universal Industrial Tint™ product (CFFS). A second pigmented curable liquid composition is prepared by mixing, in a separate ½ gallon bucket, 48 oz. of Poly One Clear™ product (CFFS) and 12% by volume (5.76 oz) Brick Red Universal Industrial Tint (CFFS). Each of these pigmented curable liquid compositions are poured into a separate chamber present on a dual-chambered tray "Split Tray" from The Woolie, Inc. A "Woolie" Dual Roller Cover from The Woolie, Inc. is then used to distribute the products onto the linoleum surface at the same time at a coverage rate of about 350 square feet per gallon, and randomly cross-rolled until the desired finish is achieved. The floor surface is permitted to cure for about 6 hours, after which time a coat of clear Poly One™ coating (CFFS) is applied at a rate of about 600 square feet per gallon using a ⅜" nap mohair roller. Subsequent to the application of the clear coating, the floor is ready for foot traffic in 6 hours, and full service in 24 hours.

Example V

Liquid Tile

Upon a plywood subfloor, LevelQuick™ self-leveling underlayment product from Custom Building Products, Seal Beach Ca. is installed per the manufacturer's instructions onto the subfloor and permitted to cure. A first pigmented curable liquid composition is prepared by mixing (using a conventional paint-mixing blade chucked into a low-speed drill) in a ½ gallon bucket, 48 fluid oz. of Poly One Clear™ coating (CFFS), and 12% by volume (5.76 oz. av.) of Pewter Universal Industrial Tint™ product (CFFS). A second pigmented curable liquid composition is prepared by mixing, in a separate ½ gallon bucket, 48 oz. of Poly One Clear™ product (CFFS) and 12% by volume (5.76 oz) Patina Universal Industrial Tint (CFFS). Each of these pigmented curable liquid compositions are poured into a dual chambered tray "Split Tray" from The Woolie, Inc. A Woolie™ Dual Roller Cover is then used to simultaneously distribute the products on the surface at a coverage rate of about 350 square feet per gallon using random cross-rolling until the desired finish is achieved. The floor is ready for foot traffic in about 6 hours, and full service in 24 hours.

Example VI

Liquid Tile

ARDEX K-15™ self-leveling underlayment from ARDEX ENGINEERED CEMENTS of Aliquippa, Pa. is installed per the manufacturer's instructions over a plywood subfloor. After 16 hours the floor is taped off in a diamond pattern using ½ masking tape. A first pigmented curable liquid composition is prepared by mixing (using a conventional paint-mixing blade chucked into a low-speed drill) in a ½ gallon bucket, 48 fluid oz. of Poly One Clear™ coating (CFFS), and 12% by volume (5.76 oz. av.) of Limestone Universal Industrial Tint™ product (CFFS). A second pigmented curable liquid composition is prepared by mixing, in a separate ½ gallon bucket, 48 oz. of Poly One Clear™ product (CFFS) and 12% by volume (5.76 oz) Earth Brown Universal Industrial Tint (CFFS). The first pigmented curable liquid composition having the pigmented color Limestone is rolled out on the surface utilizing a ⅜" nap mohair paint roller at a coverage rate of about 400 square feet per gallon. After the first pigmented curable liquid composition has been applied, the second pigmented curable liquid composition having Earth Brown color is applied using a 9" sponge roller from SHUR-LINE™ and applied at a coverage rate of about 1000 square feet per gallon. The masking tape is removed after 4 hours and the entire surface is coated a 600 square feet per gallon of Poly One™ clear sealer (CFFS) using a ⅜" nap mohair roller. The floor is ready for foot traffic in about 6 hours, and full service in 24 hours.

Example VII

A concrete slab floor is etched with RockSolid™ Safe Etch from CFFS per manufacturer's instructions. After the floor has dried for 6-8 hours, 48 oz. of Poly-One™ Clear (CFFS), (a.k.a. Polyurea 1 HD™ coating from CFFS) is mixed via a low speed drill with by volume 12% (5.76 oz) Sienna—CFFS Universal Industrial Tint in a ½ gallon bucket. In a separate ½ gallon bucket, another 48 ozs. of Poly-One™ Clear is mixed via a low-speed drill by volume 12% (5.76 oz) Brick Red—CFFS Universal Industrial Tint. Each color is poured into a dual-chambered tray "Dual Tray" from CFFS. A DUALIE™ Roller Cover is then used to distribute the products on the surface at the same time at 500 square feet per gallon and randomly cross-rolled until the desired finish is achieved. Within an hour time frame a third color mixture of Poly-One™ Earth Brown is applied using a 9" sponge roller randomly from SHUR-LINE and applied to the floor at a coverage rate of 1000 square feet per gallon. Within an hour time frame a fourth color mixture of Poly-One™ Coco Brown is applied to the floor randomly using a 9" sponge roller from SHUR-LINE and applied to the floor at a coverage rate of 1000 square feet per gallon. Subsequently, the floor is ready for foot traffic in 6 hours and full service in 24 hours.

Example VIII

One Day Floor—Marble Finish—Concrete

A concrete slab floor is etched with RockSolid™ Safe Etch from CFFS per manufactures instructions. After the floor has dried for 2-3 hours 48 oz Polyurea 1 HD Clear is mixed via a low speed drill with by volume 12% (5.76 oz) Sienna—CFFS Universal Industrial Tint, in a ½ gallon bucket. In a separate ½ gallon bucket another 48 oz Polyurea 1 HD Clear is mixed via a low speed drill by volume 12% (5.76 oz) Brick Red—CFFS Universal Industrial Tint. Each color is poured into a dual chambered tray "Split Tray" from The Woolie, Inc. A Woolie Dual Roller Cover is then used to distribute the products on the surface at the same time at 350 square feet per gallon and randomly cross rolled until the desired finish is achieved. The floor is then ready for foot traffic in 6 hours and full service in 24 hours.

Example IX

A concrete floor is etched with RockSolid™ Safe Etch from CFFS per manufactures instructions. After the floor has dried for 2-3 hours the floor is primed with a clear coat of Poly 100 SC™ from CFFS after 1 hour of dry time. 48 oz. av. of Polyurea 1 HD™ Clear™ from CFFS is mixed via a low speed drill with 12% (5.76 oz. av.) Limestone—CFFS Universal Industrial Tint in a ½ gallon bucket. In a separate ½ gallon bucket another 48 oz. av. of Polyurea 1 HD Clear™ (CFFS) is mixed via a low speed drill by volume 12% (5.76 oz) Earth Brown—CFFS Universal Industrial Tint. The first color Limestone is rolled out on the surface utilizing a ⅜" nap mohair paint roller at a rate of 400 square feet per gallon. After the first color has been applied the second color "Earth Brown" is applied using a 9" sponge roller from SHUR-LINE™ division and applied at 1000 square feet per gallon. The floor is than ready for foot traffic in 6 hours and full service in 24 hours.

Example X

A concrete floor is diamond ground with 40 grit segmented diamonds and all dust and debris is collected utilizing a vacuum. 48 oz av. of Polyurea 1 HD Clear™ (CFFS) is mixed via a low speed drill with by volume 12% (5.76 oz. av.) Pewter—CFFS Universal Industrial Tint in a ½ gallon bucket. In a separate ½ gallon bucket another 48 oz. av. of Polyurea 1 HD Clear™ (CFFS) is mixed via a low speed drill by volume 12% (5.76 oz. av.) Nickel—CFFS Universal Industrial Tint. The first color Pewter is rolled out on the surface utilizing a ⅜" nap mohair paint roller at a rate of 400 square feet per gallon. After the first color has been applied the second color "Nickel" is applied using a 9" rag roller from The Woolie, Inc. and applied at 1000 square feet per gallon. The floor is then ready for foot traffic in 6 hours and full service in 24 hours.

Example XI

Liquid Tile

A linoleum floor which has been sanded with 80 grit sandpaper and cleaned with Acetone. 48 oz. av. of Polyurea 1 HD Clear™ (CFFS) is mixed via a low speed drill with by volume 12% (5.76 oz) Sienna—CFFS Universal Industrial Tint in a ½ gallon bucket. In a separate ½ gallon bucket another 48 oz. av. of Polyurea 1 HD Clear™ (CFFS) is mixed via a low speed drill with 12% (5.76 oz. av.) Brick Red—CFFS Universal Industrial Tint. Each color is poured into a dual chambered tray "Split Tray" from The Woolie, Inc. A Woolie™ Dual Roller Cover is then used to distribute the products on the surface at the same time at 350 square feet per gallon and randomly cross rolled until the desired finish is achieved. After the floor has cured for 6 hours a coat of clear Polyurea 1 HD (CFFS) is applied at 600 square feet per gallon using a ⅜" nap mohair roller. The floor is than ready for foot traffic in 6 hours and full service in 24 hours.

Example XII

Upon a Plywood Subfloor, LevelQuick™ self-leveling underlayment from Custom Building Products, Seal Beach Ca. is applied per the manufacturer's instructions to the subfloor. After 6 hours, 48 oz. av. of Polyurea 1 HD Clear™ (CFFS) is mixed via a low speed drill with 12% (5.76 oz. av.) Pewter—CFFS Universal Industrial Tint in a ½ gallon bucket. In a separate ½ gallon bucket another 48 oz. av. of Polyurea 1 HD Clear™ (CFFS) is mixed via a low speed drill with 12% (5.76 oz) Patina—CFFS Universal Industrial Tint. Each color is poured into a dual chambered tray "Split Tray" from The Woolie, Inc. A Woolie™ Dual Roller Cover is then used to distribute the products on the surface at the same time at 350 square feet per gallon and randomly cross rolled until the desired finish is achieved. The floor is than ready for foot traffic in 6 hours and full service in 24 hours.

Example XIII

ARDEX K-15 self-leveling underlayment from ARDEX ENGINEERED CEMENTS of Aliquippa, Pa. is installed per instructions over a plywood subfloor. After 16 hours the floor is taped off in a diamond pattern using ½ masking tape. 48 oz. av. Polyurea 1 HD Clear™ (CFFS) is mixed via a low speed drill with 12% (5.76 oz. av.) of Limestone—CFFS Universal Industrial Tint in a ½ gallon bucket. In a separate ½ gallon bucket another 48 oz. av. Polyurea 1 HD Clear™ (CFFS) is mixed via a low speed drill with 12% (5.76 oz. av.) Earth Brown—CFFS Universal Industrial Tint. The first color Limestone is rolled out on the surface utilizing a ⅜" nap mohair paint roller at a rate of 400 square feet per gallon. After the first color has been applied the second color "Earth Brown" is applied using a 9" sponge roller from SHUR-LINE and applied at 1000 square feet per gallon. The masking tape is removed after 4 hours and the entire surface is coated a 600 square feet per gallon of Polyurea 1 HD™ (CFFS) clear using a ⅜" nap mohair roller. The floor is than ready for foot traffic in 6 hours and full service in 24 hours.

Suitable substrates onto which a method according to this disclosure may be employed or applicable include without limitation: wood substrates, concrete substrates, stone substrates, fiberglass substrates, laminates, and metallic substrates.

Moreover, a method according to the disclosure includes the use of first and second pigmented curable liquid compositions which are not of the same curable chemical basis. To cite but one non-limiting example, a pigmented epoxy curable liquid composition can be used simultaneously with, or before or after (beneath or over the top of) the use of a pigmented polyurethane curable liquid composition. Any combinations of any two pigmented materials among the types of curable materials selected from the group consisting of: moisture-curable polyurethanes, moisture-curable polyureas, moisture-curable epoxy polymer coatings, moisture-curable polyaspartic polyurea polymer coatings, and moisture-curable urethane-modified acrylic polymer coatings may be employed, as desired by a user, when operating according to this disclosure, independently and in any order, or applied simultaneously such as by mixing the materials substantially immediately prior to application to a selected substrate.

A pigmented curable liquid composition according to the disclosure can be applied to a substrate using any conventional equipment, wares, and/or accessories known in the art as being useful for applying coatings materials to substrates. In addition to "The Woolie™" applicator mentioned in the foregoing examples, another useful application tool is the Dualie™ roller system and dual tray available from Citadel Floor Finishing Systems of Blaine, Minn. Another useful application tool is the Wall Magic™, available from Wagner Spray Systems of Plymouth, Minn. in versions including sponged rollers, wool rollers, and textured rollers, at the option of the user.

Unexpectedly, the use of the single-component materials taught herein (moisture-curable compositions) provides for achievement of a highly-desirable variegated effect from a color meshing effect caused by the tools used to apply the materials to the substrate (rollers, sponging or other common faux painting techniques), providing an enhanced effect because it allows the coating to not dry as quickly as other quick-drying one-component or two-component coatings systems, thus producing new methods of creating color, depth, and illusion on essentially any substrate. Once cured, typically in four to ten hours, dependent on the ambient temperature and humidity, a coating according to the disclosure affords a highly chemical resistant and tough coating. Stated another way, the characteristics of curing of materials and their method of application taught herein, as a whole, permits for more mixing or co-mingling of the pigments present in each of the curable compositions with one another than prior art materials and methods, while still providing a coating that can accept full heavy traffic well within 24 hours of time elapsed, as measured from initial application of a curable composition according to this disclosure.

Although processes according to this disclosure have been described in some embodiments as employing two separate pigmented curable liquid compositions, the present disclosure includes embodiments in which more than two pigmented curable liquid compositions are employed, in multiple subsequent application of layers of pigmented curable liquid compositions over a previously-applied pigmented curable liquid composition, including the use of three, four, five, or even more than five pigmented curable liquid compositions, provided that subsequent layers are applied while the coating material present beneath them (over which they are applied) are not substantially cured, or, stated another way for some embodiments, are cured to an effective amount that is less than that which would prevent further alteration of the coloration or appearance of the substrate treated.

Generally speaking, single-component pigmented curable liquid compositions can be described as those which can be dispensed and directly applied to a substrate from the container in which they are stored and transported, without mixing with other materials, and which form a cured coating on the substrate. Within such classification are included certain polyurethanes, certain polyureas, certain epoxy polymer coatings, certain polyaspartic polyurea polymer coatings, and certain urethane-modified acrylic polymer coatings, and these materials typically react with materials present in the atmosphere, including moisture. However, a process according to this disclosure is also practicable using pigmented curable liquid compositions that are made on-site just prior to, or at the time of application to the substrate, by mixing two separate compositions with one another, which do not require reaction with materials present in the ambient environment in order for a cure to be effected, but rather, the freshly-mixed components react with one another more or less slowly to provide a cured coating on the substrate. Included in this class are certain polyurethanes, epoxies, polyureas, and polyaspartic polyureas, as is known in the art.

Although in the various examples, exact amounts of pigments are specified, the present disclosure includes various embodiments in which pigmented curable liquid compositions containing any amount of pigment in the range of from 1.00% by volume to 35.00% by volume are used, (including all percentages and ranges of percentages therebetween, these percentages being based on the total volume of a given pigmented curable liquid composition used in accordance with this disclosure.

In any embodiments selected, a user may optionally treat a substrate as treated herein, with a primer coat prior to application of a first pigmented curable liquid composition to the substrate. One material suitable for providing a priming coat is Poly 100 SC™ coating from CFFS, applied per the supplier's instructions. In any embodiments selected, a user may optionally treat a substrate as treated herein, with a clear finishing coating subsequent to application of the final pigmented curable liquid composition to the substrate. One material suitable for providing a finishing coating is Poly 1™ protective coating from CFFS, applied per the supplier's instructions.

Consideration must be given to the fact that although this invention has been described and disclosed in relation to certain preferred embodiments, equivalent modifications and alterations thereof may become apparent to persons of ordinary skill in this art after reading and understanding the teachings of this specification, drawings, and the claims appended hereto. The present disclosure includes subject matter defined by any combinations of any one or more of the features provided in this disclosure with any one or more of any other features provided in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified. The present invention has been disclosed and claimed with the intent to cover modifications and alterations that achieve substantially the same result as herein taught using substantially the same or similar structures, being limited only by the scope of the claims which follow.

The invention claimed is:

1. Method for providing a decorative protective coating on a substrate comprising:
    a) providing a first pigmented curable liquid composition comprising a first pigment;
    b) providing a second pigmented curable liquid composition comprising a second pigment, wherein the pigment in said second pigmented curable liquid composition is sufficiently visually different than the pigment present in said first pigmented curable liquid composition to produce a variegated effect between said first pigmented curable liquid composition and said second pigmented curable liquid composition;
    c) applying said first pigmented curable liquid composition and said second pigmented curable liquid composition to said substrate at ambient pressure; and
    d) allowing said compositions to cure,
said first pigmented curable liquid composition and said second pigmented curable liquid composition each yielding upon their cure a coating material selected from the group consisting of: polyurethane coatings, polyurea coatings, epoxy coatings, and urethane-modified acrylic coatings, said coating being capable of withstanding pedestrian traffic within 24 hours as measured from the time said liquid compositions are applied to said substrate.

2. Method according to claim 1 wherein each of said first pigmented curable liquid composition and said second pigmented curable liquid composition comprise a curable liquid composition independently selected from the group consisting of: moisture-curable polyurethanes, moisture-curable polyureas, moisture-curable epoxy polymer coatings, moisture-curable polyaspartic polyurea polymer coatings, and moisture-curable urethane-modified acrylic polymer coatings.

3. Method according to claim 1 wherein said first pigmented curable liquid composition and said second pigmented curable liquid composition are simultaneously applied to said substrate, subject to the proviso that said first pigmented curable liquid composition and said second pigmented curable liquid composition are not sufficiently mixed during their application to said substrate to yield a homogeneous mixture.

4. Method according to claim 3 wherein a marbled effect results on said substrate, with the color of said first pigment and the color of said second pigment being discernable from one another upon visual inspection.

5. Method according to claim 1 wherein said substrate is selected from the group consisting of: concrete substrates, cement substrates, mortar substrates wood substrates, stone substrates, fiberglass substrates, laminates, and metallic substrates.

6. Method according to claim 1, wherein the gel time of at least one (and optionally both) of the pigmented curable liquid compositions is sufficiently long to enable substantial co-mingling of the pigments present with one another to produce a variegated effect, yet short enough to prevent a homogeneous coloration of the coating from resulting, while yielding a finished coating that withstands pedestrian traffic within 24 hours.

7. A method according to claim 1 wherein at least one of said first pigmented curable liquid composition and said second pigmented curable liquid composition comprise a curable liquid composition that requires no mixing with any other material prior to its application to said substrate in order for a cured coating to result on said substrate.

8. A method according to claim 1 wherein at least one of said first pigmented curable liquid composition and said second pigmented curable liquid composition comprise a curable liquid composition that is provided by mixing two separate components with one another substantially at the time of application to said substrate, wherein said components react with one another to provide a cured coating to result on said substrate.

* * * * *